United States Patent
Chrobaczek et al.

(10) Patent No.: US 6,942,818 B2
(45) Date of Patent: Sep. 13, 2005

(54) POLYSILOXANES WITH QUARTERNARY GROUPS FEATURING NITROGEN ATOMS

(75) Inventors: Harald Chrobaczek, Augsburg (DE); Ralf Goretzki, Stadtbergen (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 64 days.

(21) Appl. No.: 10/398,824

(22) PCT Filed: Sep. 20, 2001

(86) PCT No.: PCT/EP01/10862

§ 371 (c)(1), (2), (4) Date: Apr. 10, 2003

(87) PCT Pub. No.: WO02/31256

PCT Pub. Date: Apr. 18, 2002

(65) Prior Publication Data

US 2004/0102594 A1 May 27, 2004

(30) Foreign Application Priority Data

Oct. 13, 2000 (DE) .......... 100 50 933

(51) Int. Cl.$^7$ .......... D06M 15/687
(52) U.S. Cl. .......... 252/8.61; 106/287.12; 252/8.63; 528/37; 528/38
(58) Field of Search .......... 528/25, 28, 31, 528/38, 37; 524/837, 838; 106/287.12; 252/8.61, 8.63, 8.62

(56) References Cited

U.S. PATENT DOCUMENTS

| | | | | |
|---|---|---|---|---|
| 4,399,247 A | * | 8/1983 | Ona et al. .......... | 524/204 |
| 4,921,895 A | | 5/1990 | Schaefer et al. .......... | 524/379 |
| 5,235,082 A | * | 8/1993 | Hill et al. .......... | 556/179 |
| 5,474,835 A | * | 12/1995 | McCarthy et al. .......... | 442/99 |
| 5,612,409 A | | 3/1997 | Chrobaczek et al. .......... | 524/838 |
| 5,990,334 A | | 11/1999 | Hierstetter et al. .......... | 556/413 |
| 6,242,554 B1 | | 6/2001 | Busch et al. .......... | 528/28 |
| 6,313,256 B1 | * | 11/2001 | O'Lenick, Jr. .......... | 528/28 |
| 6,432,417 B1 | * | 8/2002 | Mellul et al. .......... | 424/401 |
| 6,534,077 B2 | * | 3/2003 | Policello et al. .......... | 424/405 |
| 6,599,393 B1 | * | 7/2003 | Liu .......... | 162/158 |
| 6,649,689 B2 | * | 11/2003 | Gosselink et al. .......... | 524/588 |

FOREIGN PATENT DOCUMENTS

| | | | |
|---|---|---|---|
| DE | 19652524 | 6/1998 | |
| EP | 1000959 | 5/2000 | |
| GB | 2201433 A | * 9/1988 | .......... D06M/13/46 |
| WO | 99/32539 | 7/1999 | |

OTHER PUBLICATIONS

Chem. Abstr. 129:82372 for DE 19652524 (1998).
McGraw–Hill Dictionary of Scientific and Technical Terms, Third Edition, (1984), p. 1308.
Organic Chemistry, Morrison et al, pp. 524, 525 and 553.

* cited by examiner

*Primary Examiner*—Randy Gulakowski
*Assistant Examiner*—Marc S Zimmer
(74) *Attorney, Agent, or Firm*—Kevin T. Mansfield

(57) ABSTRACT

Described are polyorganosiloxanes that contain at least one radical in which a quaternized nitrogen atom is present. Furthermore, the polysiloxanes contain at least one further polar radical. The polyorganosiloxanes can be transformed into stable aqueous solutions or dispersons that are excellently suited for finishing textile fiber materials.

6 Claims, No Drawings

POLYSILOXANES WITH QUARTERNARY GROUPS FEATURING NITROGEN ATOMS

The invention relates to polyorganosiloxanes having at least one quaternary group comprising at least one nitrogen atom, and at least one further polar radical. Furthermore, the invention relates to the treatment of fiber materials with aqueous dispersions containing such polyorganosiloxanes.

It is known that fiber materials, in particular flat textile structures are treated with polyorganosiloxanes. The fiber materials can be provided with advantageous properties such as, for example a pleasant, soft touch. Polyorganosiloxanes that contain quaternary groups having a nitrogen atom, and the use of such polyorganosiloxanes for the treatment of fiber materials are known as well, for example from DE-A 196 52 524.

It has been found that the aqueous compositions described in said DE-A patent document have also drawbacks in addition to advantages, for example the disadvantage of exhibiting an excessively pronounced tendency to form foam, and of having hydrophilic properties that are not adequate for all purposes of application. Furthermore, the stability (homogeneity) during storage of the aqueous compositions specified in said patent document is not always optimal, in particular not if such compositions contain other products such as, for example fluorinated polymers for oil-repellent finishing of fabrics. In some cases, the compositions specified in the above DE-A document require higher amounts of dispersants in order to achieve adequate stability. Furthermore, the quaternization of the amino-functional polysiloxanes, on which the compositions are based, does not always take place at a desired rate.

WO 99/32539 describes polysiloxanes with quaternary nitrogen atoms that are suited for treating fabrics. The polysiloxanes may contain polyoxyalkylene groups that are located in the same chain as the quaternized nitrogen atoms. Said patent document, however, does not describe any polysiloxanes in which a polyoxyalkylene group is present in a nitrogen-free radical. The drawback of the polysiloxanes of said WO-document lies in the fact that aqueous dispersions of said polysiloxanes do not exhibit optimal stability in all cases.

The problem on which the present invention is based was to make available polyorganosiloxanes that do not have the above-mentioned drawbacks, and which, in the form of aqueous dispersions or solutions, are excellently suited for the treatment of fiber materials.

The problem was solved by a flowable, non-cross-linked polysiloxane having the following structural units:

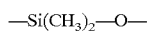

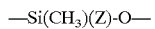

and

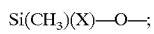

as well as, optionally, one or several units having the following structure:

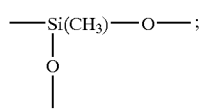

whereby said structural units may be distributed over the polysiloxane chain in any desired way, whereby the two terminal groups of the polyorganosiloxane are formed by units having the formula

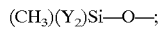

wherein all radicals Z present represent independently of each other $CH_3$ or a radical of formula (I):

 (I);

or a radical of said formula (I), in which a further radical R that is not hydrogen, is bonded to one or several of the nitrogen atoms present, so that said nitrogen atoms are present in the quaternized form;
whereby X represents $CH_3$, or a radical having the formula (II):

 (II);

whereby all radicals R represent independently of one another hydrogen or an alkyl radical with 1 to 8 carbon atoms, all radicals $R^1$, $R^4$ and $R^5$ represent independently of one another H or $CH_3$; all radicals $R^2$ represent independently of one another a linear or branched alkylene radical with 2 to 6 carbon atoms, and in each unit —$OCHR^4$—$CHR^5$, not more than one of the radicals $R^4$ and $R^5$ represent $CH_3$;
b is a number from 2 to 6;
c is 0 or 1; and
d is a number from 2 to 25;
whereby all radicals Y present independently of one another represent a radical having the formula (I), in which a further radical R, which is not hydrogen, is bonded to all nitrogen atoms present, so that all nitrogen atoms are present in the quaternized form, or whereby all radicals Y independently of one another represent a radical having the formula (III) or (IV) or (V):

 (III)

 (IV)

 (V);

whereby B is the monovalent radical derived from ethylene oxide, or a radical having the formula

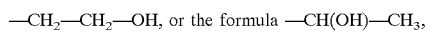

or whereby all radicals Y independently of one another represent

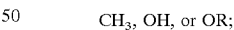

whereby the polysiloxane contains at least one radical of the formula (I), in which a further radical R is bonded to at least one nitrogen atom, said radical R not being hydrogen, so that said nitrogen atom is therefore present in the quaternized form;
whereby in case the polysiloxane does not contain any radical of the formula (II), at least one of the radicals Y is a radical having the formula (III), (IV) or the formula (V), or one radical having the formula (I), in which a further radical R, the latter not being hydrogen, is bonded to all nitrogen atoms;
whereby in case the polysiloxane does not contain any radical of the formula (II), a further radical R not being hydrogen is bonded to all nitrogen atoms present in the polysiloxane, so that all nitrogen atoms are present in the quaternized form;

whereby in case the polysiloxane contains one or several radicals X having the formula (II), all radicals Y represent $CH_3$;

and whereby the anions associated with the quaternized nitrogen atoms are methyl sulfate anions, chloride anions, benzene sulfonate anions, or toluene sulfonate anions.

Polyorganosiloxanes as defined by the invention are preferably present in the form of aqueous solutions or dispersions, which preferably contain from 5% to 60% by weight of the polyorganosiloxane as defined by the invention. Depending on the chemical nature of the polysiloxane it is possible that the latter is soluble or self-dispersible in water especially if radicals X having the formula (II) are present. In the other cases, highly stable aqueous dispersions can be obtained by adding one or several dispersing agents. Suitable as dispersants are surface-active compounds known to the expert in the field of silicone emulsions. Non-ionogenic products such as fatty alcohol ethoxylates, fatty acid ethoxylates, or ethoxylated fatty amines, or cation-active dispersants such as, for example quaternized ammonium salts have to be mentioned here in particular. The amount of dispersant is in the range of, for example from 2% to 10% by weight based on the total dispersion. The dispersions can be produced by generally known methods employed for dispersing polysiloxanes.

Polyorganosiloxanes as defined by the invention in the form of aqueous dispersions or solutions are excellently suitable for treating fiber materials, in particular flat textile structures within the framework of textile finishing or dressing. For such purposes, the solutions or dispersions may contain also other products known in the field of textile dressing such as, for example polymers with perfluoroalkyl groups for achieving oil-repelling properties; fatty acid alkanolamides; waxes in the dispersed form, or other polyorganosiloxanes. The aqueous solutions or dispersions can be applied to the fiber materials, and further processing can be carried out by generally known methods. Such aqueous solutions or dispersions are preferably applied by means of a padding process. The fiber materials are preferably flat textile structures in the form of woven or knitted fabrics, which may consist of cellulose, in particular cotton, synthetic polymers, or mixtures of said fibers.

Polysiloxanes as defined by the invention exhibit pronounced hydrophilic properties. The quaternization of the underlying amino-functional polysiloxanes, takes place at a rate that is at least satisfactory. Aqueous solutions or dispersions of said polyorganosiloxanes exhibit only a minor tendency to formation of foam; they exhibit excellent stability during storage, and provide a pleasant soft handle to the textiles finished with such polyorganosiloxanes.

Polyorganosiloxanes as defined by the invention are flowable. This means that they are either liquid or at least flowable at room temperature and thus do not have a solid or pasty consistency.

Polyorganosiloxanes as defined by the invention are not cross-linked. This means in the present conjunction that units having the structure

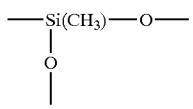

may be present, whereby Si-atoms may be present in the side chains so formed. However, such side chains are bonded to only one Si-atom of the main chain and not to any further one, with the result that the polysiloxanes do not contain any ring-shaped structures.

Polyorganosiloxanes as defined by the invention contain at least one radical in which a quaternized nitrogen atom is present, thus a nitrogen atom that is bonded to 4 carbon atoms and therefore has a positive charge. They may also contain a plurality of quaternized nitrogen atoms, as indicated in the above statements. All associated anions are either the methyl sulfate anion, the chloride anion, the benzene sulfonate anion, or a toluene sulfonate anion. Suitable toluene sulfonate anions are in this conjunction anions of the 2-, the 3-, or the 4-toluene-sulfonic acid, or mixtures thereof.

In addition to the radicals R deriving from the formula (I), which in the present case do not represent hydrogen, another radical R not representing hydrogen is bonded to all quaternary nitrogen atoms as the fourth substituent.

According to a preferred embodiment, a polyorganosiloxane as defined by the invention contains at least one radical Z of the formula

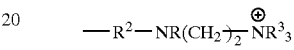

or the formula

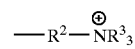

or the formula

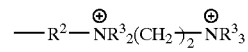

wherein all radicals $R^3$ independently of one another represent an alkyl radical with 1 to 8 carbon atoms, and whereby the associated anion is the methyl sulfonate anion, the chloride anion, the benzene sulfate anion, or a toluene sulfonate anion.

However, it is also possible that no quaternized nitrogen atom is present in any of the radicals Z present. In such a case, at least one of the radicals Y has to contain a quaternized nitrogen atom with the specified structure. However, preferably not more than one nitrogen-containing radical Y is bonded to each of the two terminal silicon atoms.

In case one or several of the radicals Y represent a radical of the formula (III), with $R^1$=H, polyorganosiloxanes as defined by the invention may offer the additional advantage that they can be bonded via the OH-group present in formula (III) to the OH-groups of a cellulose fiber by means of a cellulose cross-linking agent, which increases the durability of the finishing on the textile fiber material.

In addition to the aforementioned quaternary group containing at least one nitrogen atom, polyorganosiloxanes as defined by the invention have to contain at least one further functional group of the type specified above, notably either at least one radical X corresponding with the formula (II), or at least one radical Y corresponding with the formula (III), the formula (IV) or the formula (V), or which is a radical of the formula (I) in which a further radical R which is not hydrogen is bonded to all nitrogen atoms so that all nitrogen atoms in the formula (I) are present in the quaternized form. The aforementioned advantages of the polyorganosiloxanes as defined by the invention are achieved in this way. It is important in this connection that either at least one radical X conforming to formula (II) has to be contained in the polyorganosiloxanes as defined by the invention or that at least one of the radicals Y has to be a quaternized radical derived from the formula (I), or a radical of the formula (III), the formula (IV), or the formula (V). Polyorganosiloxanes as defined by the invention preferably contain at least one radical X conforming to the formula (II).

If polyorganosiloxanes as defined by the invention contain one or several radicals X conforming to the formula (II), all of the radicals Y are methyl groups. If no radicals X of the formula (II) are present, all nitrogen atoms present in the polysiloxane are present in the above-mentioned quaternized form.

The polyorganosiloxanes as defined by the invention can be produced according to generally known methods. It is possible, for example, to use as the starting compound a linear oligo- or polyorganosiloxane that has terminal groups of the formula $(CH_3)(Y_2)Si$—O—. Such oligo- or polysiloxanes are commercially available in the market. It is useful to employ those starting compounds that do not yet contain any quaternized nitrogen atom.

The oligo- or polysiloxane serving as the starting material can be reacted by means of the known equilibrium reaction, under alkaline catalysis with a cyclic or linear oligo- or polysiloxane with extension of the chain. Primarily octamethylcyclotetra-siloxane or hexamethylcyclotrisiloxane can be considered as cyclic siloxanes. If polyorganosiloxanes as defined by the invention are to contain one or more radicals Z having the structural formula (I), the equilibrium reaction is carried out in the presence of the respective methyldialkoxy-silane, e.g. in the presence of

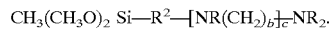

The production of the polysiloxanes with radicals X of the formula (II) as defined by the invention is made possible if a trisiloxane of the formula

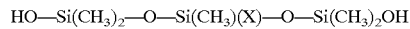

or the formula

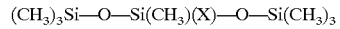

is additionally and jointly used in the equilibrium reaction. Syntheses of said type are described in EP-A 578 144.

The last step of the synthesis of polyorganosiloxanes as defined by the invention is the quaternization of one or several nitrogen atoms. This may be carried out by reaction with alkyl chloride, dimethyl sulfate, benzene sulfonic acid alkyl ester, or toluene sulfonic acid alkyl ester.

If polyorganosiloxanes as defined by the invention are not soluble in water or self-dispersing, aqueous dispersions of such polyorganosiloxanes can be obtained according to known methods, for example by stirring the polysiloxane into a composition that contains water and one or several dispersants, followed by mechanical homogenizing, if need be. The preparation of the dispersion can be carried out at room temperature or at an elevated temperature depending on the type and the quantity of the materials used.

The invention is illustrated by the following examples.

EXAMPLE 1

91 g octamethylcyclotetrasiloxane (=D4),
5.2 g $(CH_3O)_2Si(CH_3)$—$CH_2CH_2CH_2NHCH_2CH_2NH_2$,
2 g $(CH_3)_3Si$—O—$Si(X)(CH_3)$—O—$Si(CH_3)_3$
(X=—$(CH_2)_3$—O—$(CH_2CH_2O)_n$H), (n=10 to 14), and
1.5 g water
were mixed under stirring. Subsequently, 0.23 g of a 45% aqueous KOH-solution was added; the mixture was heated to 120° C.; and maintained at said temperature over 3 hours.

A product mixture with a viscosity of about 600 mPa.s at 25° C. was obtained.
10 g of an ethoxylated isotridecyl alcohol (with an average of 8 polyoxyethylene units);
1.1 g $NaHCO_3$
3 g propylene glycol;
66 g water and
0.9 g tris-(2-butoxyethyl-)phosphate
were mixed. Subsequently,
14.9 g of the product mixture obtained according to the above data was added.
1.8 g p-toluene sulfonic acid methyl ester was added under stirring at room temperature, the mixture was heated to 60° C., and stirred at said temperature for 1 hour, and another 1.8 g p-toluene sulfonic acid methyl ester was added, and stirring was continued for another 3 hours at 60° C. Thereafter, 0.5 g sodium formiate was added.

A turbid dispersion with a pH of 5 at room temperature was obtained. The polyorganosiloxane contained in the dispersion corresponded with the following formula:

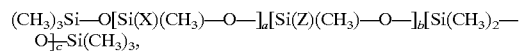

whereby X has the meaning defined above, and
Z represents

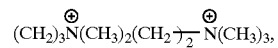

whereby the associated anions are the anions of the p-toluene sulfonic acid and
a has a value of about 8;
b has a value of about 40; and
c has a value of about 500

The individual units in the siloxane chain do not have to be distributed in the siloxane chain as shown in the above formula, but may be distributed over the chain at random.

EXAMPLE 2

91 g D4 (see example 1);
1.9 g $H_2N(CH_2)_3$—$Si(CH_3)_2$—$O[Si(CH_3)_2$—$O]_x$Si$(CH_3)_2$—$(CH_2)_3NH_2$;
5.5 g $(CH_3O)_2Si(CH_3)(CH_2)_3NH(CH_2)_2NH_2$; and
1.5 g water
whereby x had a value of about 45,
were mixed. Subsequently, the procedure was continued as specified in example 1 (starting with the addition of 0.23 g of 45% KOH), with the difference that the following amounts were used: 1.25 g $NaHCO_3$, two times 2.1 g p-toluene sulfonic acid methyl ester, 65 g water, and 0.6 g sodium formiate.

A transparent dispersion with a pH of about 5 at room temperature was obtained. The polyorganosiloxane contained in said dispersion had the following general structure (with random distribution of the individual units within the chain):

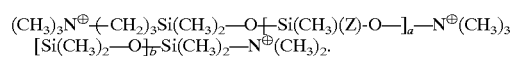

Z has the same meaning as in example 1. All corresponding anions are the anions of the p-toluene sulfonic acid, with
a=about 40 and
b=about 600.

EXAMPLE 3

90.7 g D4 (see example 1);
2.1 g HO(CH$_2$)$_3$Si(CH$_3$)$_2$—O[Si(CH$_3$)$_2$—O]$_x$Si(CH$_3$)$_2$(CH$_2$)$_3$OH
5.5 g (CH$_3$O)$_2$ Si(CH$_3$)—(CH$_2$)$_3$NH(CH$_2$)$_2$NH$_2$; and
1.5 g water
were mixed, whereby x had a value of about 45.

Further processing was carried out as specified in example 1 (starting with the addition of 0.23 g of 45% KOH)), with the difference that 1.15 g NaHCO$_3$ and two times 1.9 g p-toluene sulfonic acid methyl ester was used. A transparent dispersion with a pH of about 5 at room temperature was obtained. The polysiloxane contained in said dispersion had the following general structure (random distribution of the individual units in the chain):

HO(CH$_2$)$_3$Si(CH$_3$)$_2$—O[Si(CH$_3$)(Z)-O]$_a$[Si(CH$_3$)$_2$—O]$_b$—Si(CH$_3$)$_2$(CH$_2$)$_3$OH, with a=about 41 and
b=about 600.
Z had the structure as specified in example 1.
The associated anions are the anions of the p-toluene sulfonic acid.

What is claimed is:

1. A flowable, non-cross-linked polyorganosiloxane having the following structural units —Si(CH$_3$)$_2$—O—;

—Si(CH$_3$)(Z)-O—; and

—Si(CH$_3$)(X)—O—;

as well as, optionally, one or several units having the following structure:

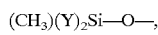

whereby said structural units may be distributed over the polysiloxane chain in any desired way;
whereby the two terminal groups of the polyorganosiloxane are formed by units having the formula (CH$_3$)(Y)$_2$Si—O—, wherein all radicals Z present independently of one another represent CH$_3$ or a radical having the formula (I)

—R$^2$—[NR(CH$_2$)$_b$]$_c$NR$_2$ (I), or a radical of said formula (I), in which a additional radical R, where the additional radical R is not hydrogen is bonded to one or several of the nitrogen atoms present, so that said nitrogen atoms are in the quaternized form;
whereby X represents CH$_3$ or a radical having the formula (II)

—R$^2$—(OCHR$^4$—CHR$^5$)$_d$OR$^1$ (II);

whereby all radicals R independently of one another represent hydrogen or an alkyl radical with 1 to 8 carbon atoms; all radicals R$^1$, R$^4$ and R$^5$ independently of one another represent H or CH$_3$; all radicals R$^2$ independently of one another represent a linear or a branched alkylene radical with from 2 to 6 carbon atoms, and in each unit —OCHR$^4$—CHR$^5$ not more than one of the radicals R$^4$ and R$^5$ represent CH$_3$;

b is a number of from 2 to 6,
c is a number of 0 or 1; and
d is a number of from 2 to 25;
whereby all radicals Y present independently of one another represent a radical of the formula (I), in which a additional radical R, where the additional radical R is not hydrogen is bonded to all nitrogen atoms present, so that all nitrogen atoms are present in the quaternized form, or whereby all radicals Y independently of one another represent a radical of the formula (III) or (IV) or (V)

—R$^2$—CH(OR$^1$)R (III)

—R$^2$—COOH (IV)

 (V)

whereby B is the monovalent radical derived from ethylene oxide or a radical having the formula —CH$_2$—CH$_2$—OH, or the formula —CH(OH)—CH$_3$, or whereby all radicals Y independently of one another represent CH$_3$, OH or OR, whereby the polysiloxane contains at least one radical of the formula (I), in which at least one additional radical R, where the additional radical R is not hydrogen is bonded to at least one nitrogen atom and said nitrogen atoms is therefore present in the quaternized form;

whereby in case the polysiloxane does not contain any radical of the formula (II), at least one of the radicals Y is a radical having the formula (III), (IV) or (V), or a radical of the formula (I) in which a further radical R which is not hydrogen is bonded to all nitrogen atoms;

whereby in case the polysiloxane does not contain any radical of the formula (II), a further radical R, the latter not being hydrogen, is bonded to all nitrogen atoms present in the polysiloxane, so that all nitrogen atoms are present in the quaternized form;

whereby in case the polysiloxane contains one or several radicals X of the formula (II) all radicals Y represent CH$_3$;

and whereby the anions associated with the quaternized nitrogen atoms are methyl sulfate anions, chloride anions, benzene sulfonate anions, or toluene sulfonate anions.

2. The polyorganosiloxane according to claim 1, which contains at least one radical Z having the formula —R$^2$—NR(CH$_2$)$_2$N$^{\oplus}$R$^3{}_3$;

or the formula

—R$^2$—N$^{\oplus}$R$^3{}_3$;

or the formula

wherein all radicals $R^3$ independently of one another represent an alkyl radical with from 1 to 8 carbon atoms, and whereby the associated anion is the methyl sulfate anion, the chloride anion, the benzene sulfonate anion or a toluene sulfonate anion.

3. An aqueous solution or dispersion containing a polyorganosiloxane according to claim 1.

4. A method of treating fiber materials which comprises applying a dispersion according to claim 3 thereto.

5. An aqueous solution or dispersion containing a polyorganosiloxane according to claim 2.

6. A method of treating fiber materials which comprises applying a dispersion according to claim 5 thereto.

* * * * *